3,201,193
PRECIPITATION OF SOLUBLE $P_2O_5$ VALUES FROM $NH_4F$ SOLUTIONS

Arthur N. Baumann, Lakeland, Fla., assignor to International Minerals & Chemical Corporation, a corporation of New York
No Drawing. Filed July 3, 1963, Ser. No. 292,747
10 Claims. (Cl. 23—88)

This invention relates to a method for purifying aqueous solutions of ammonium fluoride. More particularly, it relates to a method for the removal of phosphatic contaminants from aqueous solutions of ammonium fluoride prepared by the reaction of ammonia with aqueous solutions of fluorine containing compounds derived from den gas.

An economical raw material for the production of ammonium fluoride is den gas. By the term "den gas" is meant the gas evolved when phosphate rock, apatite, bones or other phosphatic material containing fluorine compounds are decomposed by reaction with a mineral acid such as sulfuric acid in the manufacture of phosphoric acid or superphosphates. This den gas contains silicon tetrafluoride which is commonly absorbed in water to prevent its escape to the atmosphere. Upon absorption with water, silicon tetrafluoride reacts to form fluosilicic acid, which may be reacted with ammonia to produce ammonium fluoride. Sometimes den gases are absorbed directly in an ammonia-containing aqueous medium to form ammonium fluoride.

The den gases generally also contain entrained phosphate rock dust, entrained phosphoric acid droplets, and other phosphatic impurities which are taken up in the silicon tetrafluoride absorption system. Entrained rock dust will react with fluosilicic acid to form insoluble fluorides and phosphoric acid. The phosphoric acid will react with free ammonia present in the absorption medium to form mono-ammonium phosphate or di-ammonium phosphate, depending upon the pH of the medium. The phosphatic impurities will remain in solution during subsequent reactions, thereby contaminating products manufactured from the ammonium fluoride.

It is an object of this invention to provide a method for the purification of aqueous solutions of ammonium fluoride.

Yet another object of this invention is to provide a method for the removal of phosphatic contaminants from ammonium fluoride solutions.

A specific object of this invention is to provide a method for the removal of ammonium phosphate contaminants from aqueous solutions of ammonium fluoride.

Briefly, the method of this invention comprises reacting an aqueous solution of ammonium fluoride with an oxide, hydroxide, carbonate or fluoride of a Group IIB metal at ambient or low elevated temperatures while maintaining the pH of the aqueous solution in the range of about 6.0 to 8.0, and separating a phosphate-containing precipitate.

Ammonium fluoride solutions treated in accordance with this invention may be of any desired concentration. Conventionally, ammonium fluoride solutions derived from the absorption of den gases in water or aqua ammonia and the ammoniation of the resulting liquor, will contain about 20 weight percent of ammonium fluoride. Such solutions are well suited for treatment in accordance with this invention. The reaction is preferably carried out at temperatures in the range of ambient temperatures to about 70° C., and more preferably at about 50° C. The reactant, as exemplified by zinc oxide, is added in the amount of 1 to 3 times the stoichiometric amount required to react with the phosphatic impurities in the solution. The phosphatic impurities may range from as little as 0.1 weight percent to as much as 2.0 weight percent, calculated as $P_2O_5$. Good results have been obtained adding zinc oxide in an amount equivalent to 1.3 times the stoichiometric quantity required to react with the phosphatic impurities.

The ammonia fluoride solution is agitated after the addition of zinc oxide to disperse the oxide and provide intimate contact between it and the aqueous solution. During the reaction, which preferably will occur over a period of about 30 minutes to 2 hours, the pH of the solution is maintained in the range of 6.0 to 8.0 and more preferably in the range of 7.0 to 7.5. After the reaction has gone to substantial completion the solution is filtered and phosphatic precipitates, in an amount containing about 95% of the initial $P_2O_5$ content of the solution, are removed. The solubility of these precipitates is lowest in the pH range of 7.0 to 7.5, and increases sharply outside of the range of 6.0 to 8.0. Reaction proceeds more rapidly at higher pH's while its extent is greatest in the 7.0 to 7.5 pH range. The amount of purification desired may make operating at a higher pH for a shorter period of time attractive. It has been found, however, that the greatest purification can be obtained at pHs in the range of 7.0 to 7.5. The time of reaction is not critical, but it has been found that the reaction will seldom be sufficiently complete in less than 30 minutes to provide satisfactory purification. On the other hand, at longer time intervals the added metal tends to become soluble in the aqueous solution, and itself becomes a contaminant. Optimum purification can generally be obtained at reaction times of 30 minutes to 2 hours, especially at a temperature of about 50° C. and a pH in the range of 7.0 to 7.5. The pH is preferably adjusted, when necessary, by controlled addition of ammonia or hydrofluoric acid.

Reactants suitable for use in the process of this invention are the oxides, hydroxides, carbonates and fluorides of Group IIB metals. Especially preferred is zinc oxide. Examples of other suitable reactants are zinc fluoride, zinc carbonate, zinc hydroxide, cadmium oxide, and cadmium fluoride.

It will be understood that the phosphatic impurities may be present in the form of numerous different compounds. However, exemplary of the reaction which takes place in accordance with this invention is that between monoammonium phosphate and zinc oxide, which may be written:

$$NH_4H_2PO_4 + ZnO \rightarrow ZnNH_4PO_4 + H_2O$$

The reaction between zinc oxide and diammonium phosphate may be written:

$$(NH_4)_2HPO_4 + ZnO \rightarrow ZnNH_4PO_4 + NH_4OH$$

The reaction between monoammonium phosphate and zinc fluoride may be written:

$$NH_4H_2PO_4 + ZnF_2 + 2NH_4OH$$
$$\rightarrow ZnNH_4PO_4 + 2NH_4F + 2H_2O$$

It will be understood that the foregoing reactions are not intended to limit the process of the invention but are merely exemplary of the reactions which occur. The complex Group IIB metal-ammonium phosphate salts are highly insoluble in aqueous ammonium fluoride having a pH in the range of 6.0 to 8.0, and are precipitated almost quantitatively and can be readily removed.

The practicability of the invention of this method has been demonstrated by laboratory experiments. A number of 100 gram portions of a 20% ammonium flouride solution made from fluosilicic acid derived from den gases were weighed into plastic containers. The solution contained sufficient monoammonium phosphate dissolved therein to provide a $P_2O_5$ content of 0.130%. The containers were placed in a water bath, heated to 50° C., and then reacted with various quantities of chemical pure powdered zinc oxide. Agitation supplied to these samples was strong in order to break up the lumps of zinc oxide when the reactant was introduced into the aqueous phase. Results of these experiments are given in the following table.

*Table I*

PRECIPITATION OF SOLUBLE $P_2O_5$ FROM $NH_4F$ SOLUTION

| pH of Solution | ZnO added (grams) | Reaction time (hours) | Final sol $P_2O_5$ (percent) |
|---|---|---|---|
| 5.7 | 0.40 | 2 | 0.107 |
| 6.1 | 0.40 | 2 | 0.012 |
| 6.7 | 0.40 | 2 | 0.002 |
| 7.5 | 0.40 | 2 | 0.001 |
| 6.3 | 0.40 | ½ | 0.073 |
| 7.4 | 0.40 | ½ | 0.004 |
| 7.8 | 0.40 | ½ | 0.008 |
| 8.2 | 0.40 | ½ | 0.032 |
| 6.3 | 0.30 | ½ | 0.092 |
| 6.8 | 0.30 | ½ | 0.005 |
| 7.7 | 0.30 | ½ | 0.005 |
| 8.2 | 0.30 | ½ | 0.028 |
| 7.2 | 0.20 | 2 | 0.002 |
| 6.8 | 0.20 | ½ | 0.097 |
| 6.7 | 0.20 | ½ | 0.002 |
| 7.8 | 0.20 | ½ | 0.015 |

These results show over 95% removal of the soluble $P_2O_5$ content in a 20% ammonium fluoride solution. The lowest zinc oxide addition (0.2 gram per 100 grams of ammonium fluoride) is 1.33 times the stoichiometric amount required to precipitate the 0.131% $P_2O_5$ content as zinc ammonium phosphate. This compound was found by X-ray defraction patterns to be the major constituent of the solids precipitated in these experiments. In addition the data shows that the pH of the reaction is critical. At pH 8.0 the zinc ion become more soluble, thus reducing the amount of precipitate and the amount of phosphate removed. Both the rate of reaction and the final solubility of the zinc ion is less at pHs below about 7.0. Phosphate precipitation rate is dependent to some degree upon the zinc content of the solution. Phosphate removal can be held constant at lower pHs by increasing the reation time.

While the invention has been described with reference to prefered embodiments thereof, and has been illustrated by detailed examples, it will be understood that within the scope of the appended claims the invention can be practiced other than as specifically described.

The embodiments of the invention in which an exclusive property or privilege is claimed are defined as follows:

1. The method for the purification of an aqueous solution of ammonium fluoride containing a minor proportion of phosphatic impurities comprising reacting said solution with a compound of the group consisting of oxides, hydroxides, carbonates, and fluorides of Group IIB metals, at a pH in the range of 6.0 to 8.0, in an amount and for a time sufficient to precipitate a substantial portion of said phosphatic impurities as metal-ammonium phosphates, and separating said phosphates to recover a purified solution of ammonium fluoride.

2. The method in accordance with claim 1 in which said reaction is carried out at a temperature of a range of about ambient to 70° C.

3. The method in accordance with claim 2 including the step of adjusting the pH of said solution to a value in the range of 7.0 to 7.5 by controlled addition of ammonia to said solution.

4. The method in accordance with claim 3 in which said temperature is about 50° C. and the time of reaction is about ½ hour to 2 hours.

5. The method in accordance with claim 4 in which the amount of said compound is about 1 to 3 times the stoichiometric amount required to react with said phosphatic impurities.

6. The method in accordance with claim 5 in which said compound is zinc oxide.

7. The method in accordance with claim 1 in which said compound is an oxide of a Group IIB metal.

8. The method in accordance with claim 7 in which said reaction is carried out at a temperature of about 50° C. and the time of reaction is about ½ hour to 2 hours.

9. The method in accordance with claim 8 including the step of adjusting the pH to a value in the range of 7.0 to 7.5 by controlled addition of ammonia to said solution.

10. The method in accordance with claim 9 in which amount of said oxide is in the range of 1 to 3 times the stoichiometric amount required to react with said phosphatic impurities.

References Cited by the Examiner

UNITED STATES PATENTS

| 1,617,098 | 2/27 | Blumenberg | 23—105 |
| 3,024,086 | 3/62 | Cines | 23—88 |
| 3,126,254 | 3/64 | Salutsky et al. | 23—105 |

MAURICE A. BRINDISI, *Primary Examiner.*